United States Patent [19]
Kilar

[11] 4,284,067
[45] Aug. 18, 1981

[54] PORTABLE SOLAR HEATER

[76] Inventor: Louise J. Kilar, 192 Elm St., Masury, Ohio 44438

[21] Appl. No.: 149,908

[22] Filed: May 15, 1980

[51] Int. Cl.³ ................................................ F24J 3/02
[52] U.S. Cl. .................................... 126/436; 126/438; 126/445
[58] Field of Search ............... 126/430, 432, 436, 444, 126/445, 438

[56] References Cited

U.S. PATENT DOCUMENTS

| | | | |
|---|---|---|---|
| 3,412,728 | 11/1968 | Thomason | 126/429 |
| 3,939,818 | 2/1976 | Hamilton et al. | 126/432 |
| 3,946,944 | 3/1976 | Keyes et al. | 126/436 |
| 3,996,919 | 12/1976 | Hepp | 126/436 |
| 4,061,129 | 12/1977 | Wilson | 126/436 |
| 4,100,914 | 7/1978 | Williams | 126/429 |
| 4,129,919 | 9/1978 | Davis | 15/302 |
| 4,155,346 | 5/1979 | Aresty | 126/445 |

*Primary Examiner*—Carroll B. Dority, Jr.
*Assistant Examiner*—Robert J. Marett
*Attorney, Agent, or Firm*—Harpman & Harpman

[57] ABSTRACT

A portable solar heater combines a self-contained hot air and heat storage system having a collector area with adjustable reflectors in a unit that can be moved from room to room as needed. The heater has fans for circulation of the solar heater air and provides both direct and indirect heat transfer to the ambient room air.

8 Claims, 4 Drawing Figures

U.S. Patent    Aug. 18, 1981    4,284,067
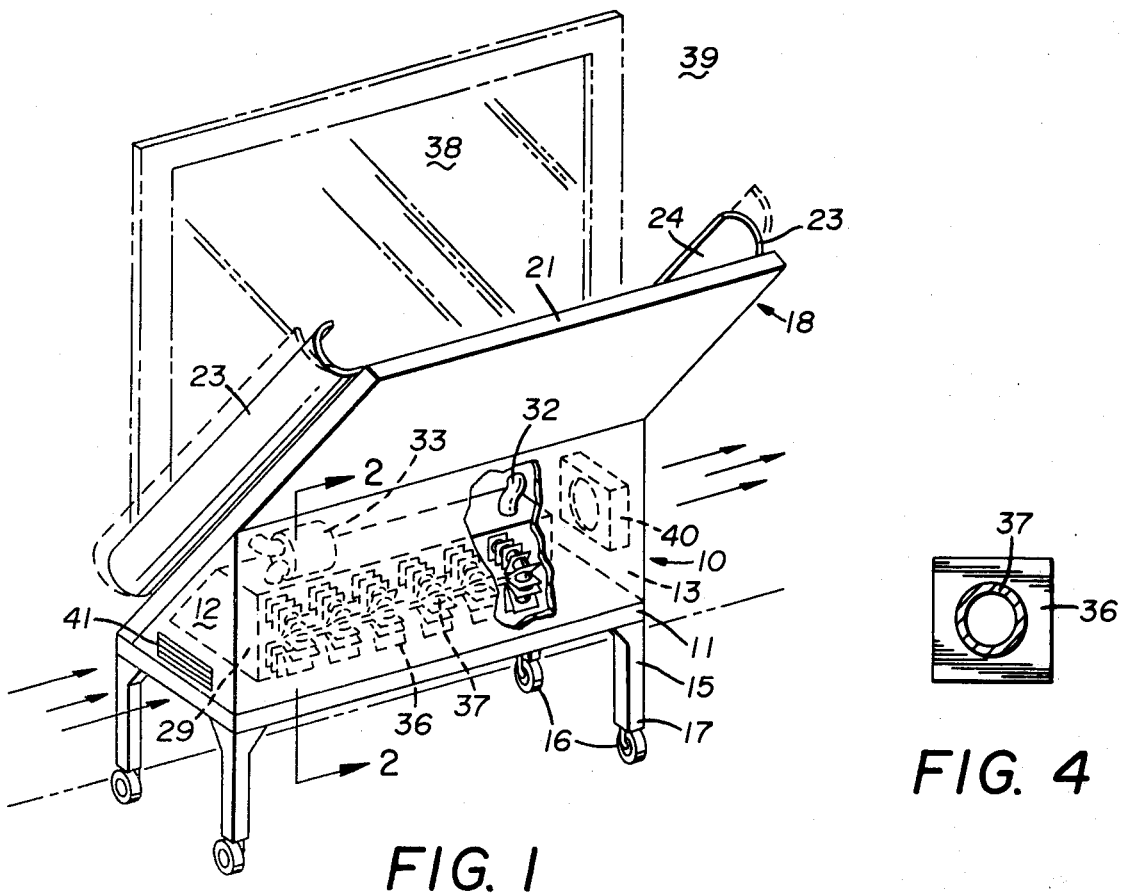
FIG. 1
FIG. 4
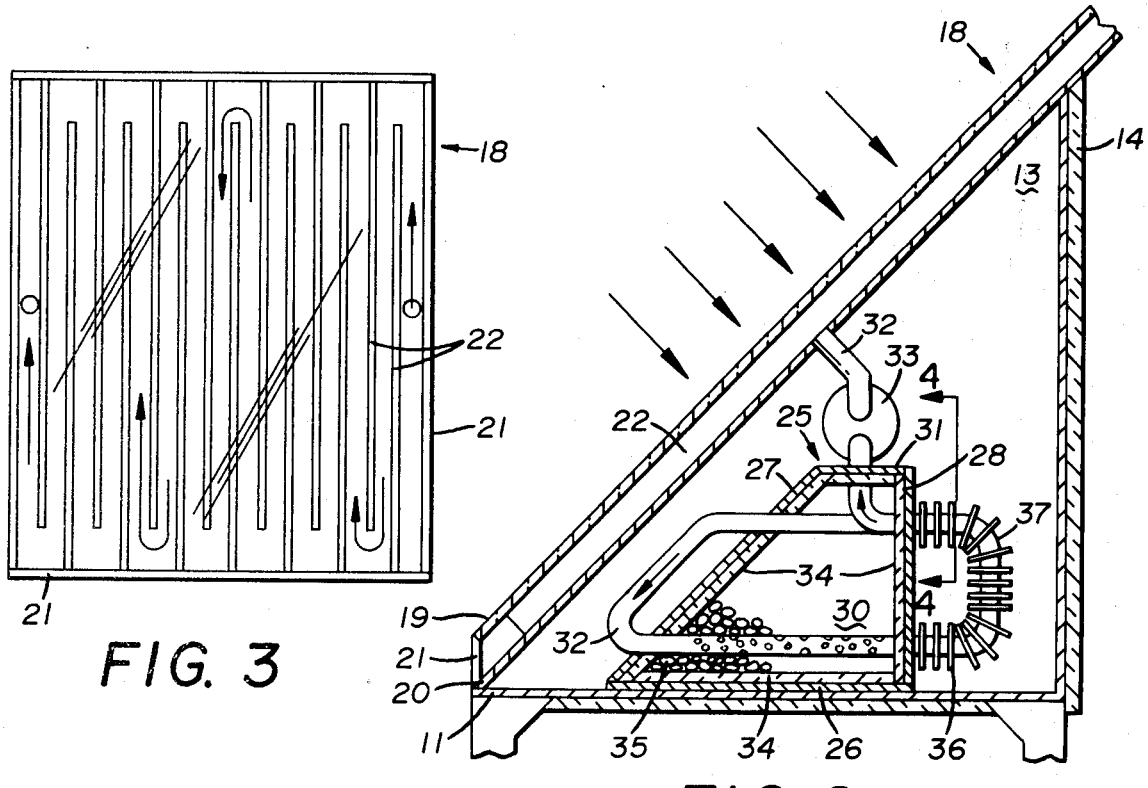
FIG. 3
FIG. 2

PORTABLE SOLAR HEATER

BACKGROUND OF THE INVENTION (1) Field of the Invention

This invention relates to solar heaters utilizing solar heated air and a heat exchanger and storage combination.

(2) Description of the Prior Art

Prior art devices of this type have used a variety of different arrangements. See for example U.S. Pat. Nos. 3,412,728, 4,100,914 and 4,112,919.

In U.S. Pat. No. 3,412,728 a solar heater is disclosed that uses a double wall heat collector and power air exchanger with a storage medium.

U.S. Pat. No. 4,100,914 is a solar energy collector that is positioned outside the building with a plurality of opaque corrugated metal tubes for use as heat collectors.

In U.S. Pat. No. 4,112,919 a window mounted solar heater unit has a number of open end tubes within a transparent enclosure.

Applicant's device is a portable self-contained heater that provides a large baffled collector with a finned tubular heat exchanger which passes through a storage container filled with a heat retaining medium.

SUMMARY OF THE INVENTION

A self-contained portable solar heater for use inside a structure provides a solar collector with reflectors to heat air that is moved by a blower through a heat retaining medium to provide both direct and indirect heat exchange with the ambient room air.

DESCRIPTION OF THE DRAWINGS

FIG. 1 is a perspective view of the portable solar heater;

FIG. 2 is a vertical section on line 2—2 of FIG. 1;

FIG. 3 is a plan view of a solar collector used in the device of FIG. 1; and

FIG. 4 is a cross section on line 4—4 of FIG. 2.

DESCRIPTION OF THE PREFERRED EMBODIMENT

A portable self-contained solar heater for use in residential housing as will be seen in FIGS. 1 and 2 of the drawings comprises a triangular shaped enclosure 10 having a rectangular bottom 11 with vertical ends 12 and 13 and a back wall 14, all of which extend at right angles to said bottom 11.

A number of legs 15 extend downwardly from the bottom 11 providing elevation and support for the heater. Each of the legs 15 has a wheel 16 secured to its lower end 17.

A collector panel 18 has a pair of rectangular members 19 and 20 spaced in relation to one another by side walls 21 and a plurality of staggered baffles 22 so as to form a tortuous passageway. The member 19 is transparent to allow some light to penetrate the enclosure and heat air circulated therein. A pair of transversely curved reflectors 23 are secured to said collector panel 18 along two of the side walls 21 as seen in FIG. 1 of the drawings. The reflectors 23 are made from a semi-flexible material which allows for adjustment as indicated by the broken lines. A highly reflective surface 24 on the reflectors 23 can be of any suitable material such as thin aluminum foil or silver coated mylar film. The collector panel 18 is mounted on the open side of the enclosure 10 at the angle formed by the ends 12 and 13 which is determined by the degree of latitude where the user is located relative the distance from the equator.

Referring now to FIGS. 1 and 2 of the drawings, a secondary enclosure 25 can be seen with the first enclosure 10 and has a base 26, an angled front wall 27, and a vertical back wall 28. Ends 29 and 30 and a top 31 complete the secondary enclosure 25. An elongated tubular member 32 communicates with the collector panel 18 and passes repeatedly through apertures in the front and back walls 27 and 28 of the secondary enclosure 25.

A blower assembly 33 is positioned adjacent the top 31 of the secondary enclosure 25 and connects one end of the tubular member 32 with the collector panel 18 through an aperture within the rectangular member 20. The secondary enclosure 25 has interior lining 34 of insulation material such as expanded styrofoam and is filled with a heat storage medium such as rocks 35. Water can be substituted for the rocks 35 if desired.

A number of heat exchanger fins 36 are secured to a portion 37 of the elongated tubular member 32 on the outside of the secondary enclosure 25 to increase the relative surface area thereof.

In use, the solar heater is positioned in front of a window 38 in a wall 39 as seen in FIG. 1 of the drawings. The sunlight strikes the reflector 23 and the collector panel 18 heating the air therein. The air is circulated around the baffles 22 by the blower assembly 33. The heated air is then moved through the elongated tubular body member 32 that passes repeatedly through the secondary enclosure 25 and out through apertures within the tubular body member 32 heating the rocks 35 and the air within the enclosure 10.

Room air is circulated through the enclosure 10 over the tubular member 32 and fins 36 by a fan 40 mounted in an aperture in the end 13 of the enclosure 10. Cool air enters the enclosure 10 by an inlet 41 located in the other end 12 and is heated as it travels through the enclosure 10 exiting through the fan 40 into the room.

Both the fan 40 and the blower assembly 33 are powered by electrical motors that operate on standard 110 volt AC power supply as is normally available in residential housing.

Thus it will be seen that a new and useful solar heater has been illustrated and described and it will be apparent to those skilled in the art that various changes and modifications may be made therein without departing from the spirit of the invention.

Having thus described my invention what I claim is:

1. A portable solar heater comprising a first enclosure, a collector panel mounted on said first enclosure, said collector panel comprising a pair of spaced rectangular members, a side wall between said rectangular members, a plurality of baffles between said rectangular members, one of said panels being transparent, a secondary enclosure within said first enclosure, an insulation liner within said secondary enclosure, a tubular member positioned partially within said secondary enclosure and partially within said first enclosure, means for moving air through said collector panel and through said tubular member, means for retaining heat within said second enclosure and means for circulating air through said first enclosure over said secondary enclosure and said tubular member.

2. The portable solar heater of claim 1 wherein said baffles are parallel and spaced with respect to one another to form a tortuous passageway.

3. The portable solar heater of claim 1 wherein means for concentrating sunlight on said collector panel are positioned adjacent said panel.

4. The portable solar heater of claim 3 and wherein said means for concentrating sunlight are elongated light reflectors.

5. The portable solar heater of claim 1 and wherein heat exchanger fins are positioned on said tubular member within said first enclosure.

6. The portable solar heater of claim 1 wherein said means for moving air through said collector panel and tubular member comprises a blower.

7. The portable solar heater of claim 1 wherein said means for circulating air through said first enclosure over said secondary enclosure comprises a fan.

8. The portable solar heater of claim 1 wherein said tubular member within said secondary enclosure is apertured so that air may be circulated through said means for retaining heat within said secondary enclosure.

* * * * *